(12) United States Patent
An et al.

(10) Patent No.: US 11,279,040 B2
(45) Date of Patent: Mar. 22, 2022

(54) ROBOT PROCESS AUTOMATION APPARATUS AND METHOD FOR DETECTING CHANGES THEREOF

(71) Applicant: SAMSUNG SDS CO., LTD., Seoul (KR)

(72) Inventors: Kyung Jun An, Seoul (KR); Sung Ho Jang, Seoul (KR); Jun Hee Cho, Seoul (KR); Jong Yoon Jo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 195 days.

(21) Appl. No.: 16/664,494

(22) Filed: Oct. 25, 2019

(65) Prior Publication Data

US 2021/0122051 A1 Apr. 29, 2021

(30) Foreign Application Priority Data

Oct. 24, 2019 (KR) .......................... 10-2019-0133073

(51) Int. Cl.
*B25J 9/16* (2006.01)

(52) U.S. Cl.
CPC .................................. *B25J 9/1697* (2013.01)

(58) Field of Classification Search
CPC ........................................................ B25J 9/1697
See application file for complete search history.

(56) References Cited

U.S. PATENT DOCUMENTS

| 10,769,427 | B1* | 9/2020 | Gajera | G06K 9/6262 |
|---|---|---|---|---|
| 10,860,905 | B1* | 12/2020 | Gligan | G06F 16/93 |
| 10,885,423 | B1* | 1/2021 | Voicu | G06N 3/004 |
| 10,908,950 | B1* | 2/2021 | Dennis | G06F 9/4881 |
| 10,970,109 | B1* | 4/2021 | Berenstein | G06F 11/3024 |
| 10,977,166 | B1* | 4/2021 | Jaganmohan | G06N 5/04 |
| 2019/0155225 | A1* | 5/2019 | Kothandaraman | G06N 20/00 |
| 2019/0303779 | A1* | 10/2019 | Van Briggle | G06F 11/3013 |
| 2020/0180148 | A1* | 6/2020 | S Nanal | G05B 19/0423 |
| 2020/0387358 | A1* | 12/2020 | Chae | G06F 9/455 |
| 2021/0107141 | A1* | 4/2021 | Shrivastava | G06F 8/60 |

FOREIGN PATENT DOCUMENTS

KR 10-2013-0119715 A 11/2013

* cited by examiner

*Primary Examiner* — Nicholas Kiswanto
(74) *Attorney, Agent, or Firm* — The PL Law Group, PLLC

(57) ABSTRACT

According to aspects of the present disclosure, a change detection method for ROBOT process automation (RPA) performed by a computer device includes obtaining object information of a target object from first working environment information at a first time, and determining a comparison object detected in second working environment information at a second time as an object corresponding to the target object based on the obtained object information of the target information. Thus, even if an error occurs due to a change in a working environment, an RPA apparatus can operate normally by correcting the error by itself without the need for a user to recreate a new bot or modify the existing bot. Also, even if the position or shape of an object referred to by RPA in a screen is changed, the RPA apparatus can accurately find an object to manipulate based on surrounding information and perform RPA normally.

12 Claims, 10 Drawing Sheets

20

ROBOT PROCESS AUTOMATION APPARATUS AND METHOD FOR DETECTING CHANGES THEREOF

CROSS REFERENCE TO RELATED APPLICATIONS AND CLAIM OF PRIORITY

This application claims priority to and the benefit of Korean Patent Application No. 10-2019-0133073, filed on Oct. 24, 2019, the disclosure of which is incorporated herein by reference in its entirety.

FIELD

The present disclosure relates to a ROBOT process automation (RPA) apparatus and a change detection method of the same, and more particularly, to an RPA apparatus which, even when a working environment is changed, can operate by adapting to the changed environment and a change detection method of the RPA apparatus.

DESCRIPTION OF THE RELATED ART

ROBOT process automation (RPA) refers to an automation technology or service that allows robots to mimic and perform regular and repetitive human tasks. With the development of artificial intelligence (AI) technology, RPA has greatly improved its function and utility in recent years and positively contributed to enterprise workflow efficiency. According to Gartner, a research firm specializing in the information technology (IT) field, a global RPA market is growing much faster than other enterprise software markets, and the market size for the year 2019 is estimated at 1.3 billion dollars, about a 54% increase year-on-year.

RPA works by getting a robot to repeatedly perform a predefined task by designating a task target object and then registering a task event to be performed. Therefore, to apply RPA, it is required to create a bot (software that repeatedly performs a predefined RPA task) by designing a repetitive process.

However, since the bot is created based on a working environment at the time of creation, if the working environment is changed after the creation of the bot (e.g., if the resolution of a graphical user interface (GUI) or the version of a website or program to which RPA will be applied is changed or if the bot is shared with other users), the bot may malfunction instead of operating normally or may stop working. To solve such errors, a new bot must be recreated, or the existing bot must be modified based on the changed working environment. However, recreating a new bot or modifying the existing bot generally requires a lot of time even for an experienced user because the user has to manually set definition elements necessary for RPA. In particular, in a situation where the working environment is frequently changed, too much resources are required to recreate a new bot or modify the existing bot, making it difficult to effectively apply RAP.

SUMMARY

Aspects of the present disclosure provide a ROBOT process automation (RPA) apparatus which, even if an error occurs due to a change in a working environment, can operate normally by correcting the error by itself according to the change in the working environment without the need for a user to recreate a new bot or modify the existing bot, and a change detection method of the RPA apparatus.

Aspects of the present disclosure also provide an RPA apparatus which, even if the position or shape of an object referred to by RPA in a screen is changed, can accurately find an object to manipulate based on surrounding information and can perform RPA normally, and a change detection method of the RPA apparatus.

Aspects of the present disclosure also provide an RPA apparatus which detects changes in an object and automatically updates object information and a change detection method of the RPA apparatus.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to aspects of the present disclosure, there is provided a change detection method for ROBOT process automation (RPA) performed by a computer device. The method comprises obtaining object information of a target object from first working environment information at a first time, and determining a comparison object detected in second working environment information at a second time as an object corresponding to the target object based on the obtained object information of the target information.

According to another aspects of the present disclosure, there is provided a change detection method for ROBOT process automation (RPA) performed by a computer device. The method comprises executing a bot for RPA, determining whether an operation error of the bot has occurred, detecting changes in an object referred to by the bot if it is determined that the operation error has occurred, and updating object information of the object based on the change detection result.

According to aspects of the present disclosure, there is provided a change detection apparatus for ROBOT process automation (RPA) performed by a computer device. The apparatus comprises a memory which loads a computer program comprising one or more instructions, and a processor which executes the instructions, wherein the computer program comprises an RPA performing module which creates and executes a bot for RPA, and a change detection module which detects changes in an object referred to by an event having an error when the error occurs during execution of the bot, wherein the change detection module determines a comparison object detected in working environment information at a time when the error occurred as the object referred to by the event based on object information of the object referred to by the event.

According to aspects of the present disclosure described above, even if an error occurs due to a change in a working environment, an RPA apparatus can operate normally by correcting the error by itself without the need for a user to recreate a new bot or modify the existing bot.

In addition, even if the position or shape of an object referred to by RPA in a screen is changed, the RPA apparatus can accurately find an object to manipulate based on surrounding information and can perform RPA normally.

Furthermore, when the object referred to by RPA is changed, the RPA apparatus can detect changes in the object by itself and automatically update object information.

However, the effects of the present disclosure are not restricted to the one set forth herein. The above and other effects of the present disclosure will become more apparent to one of daily skill in the art to which the present disclosure pertains by referencing the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
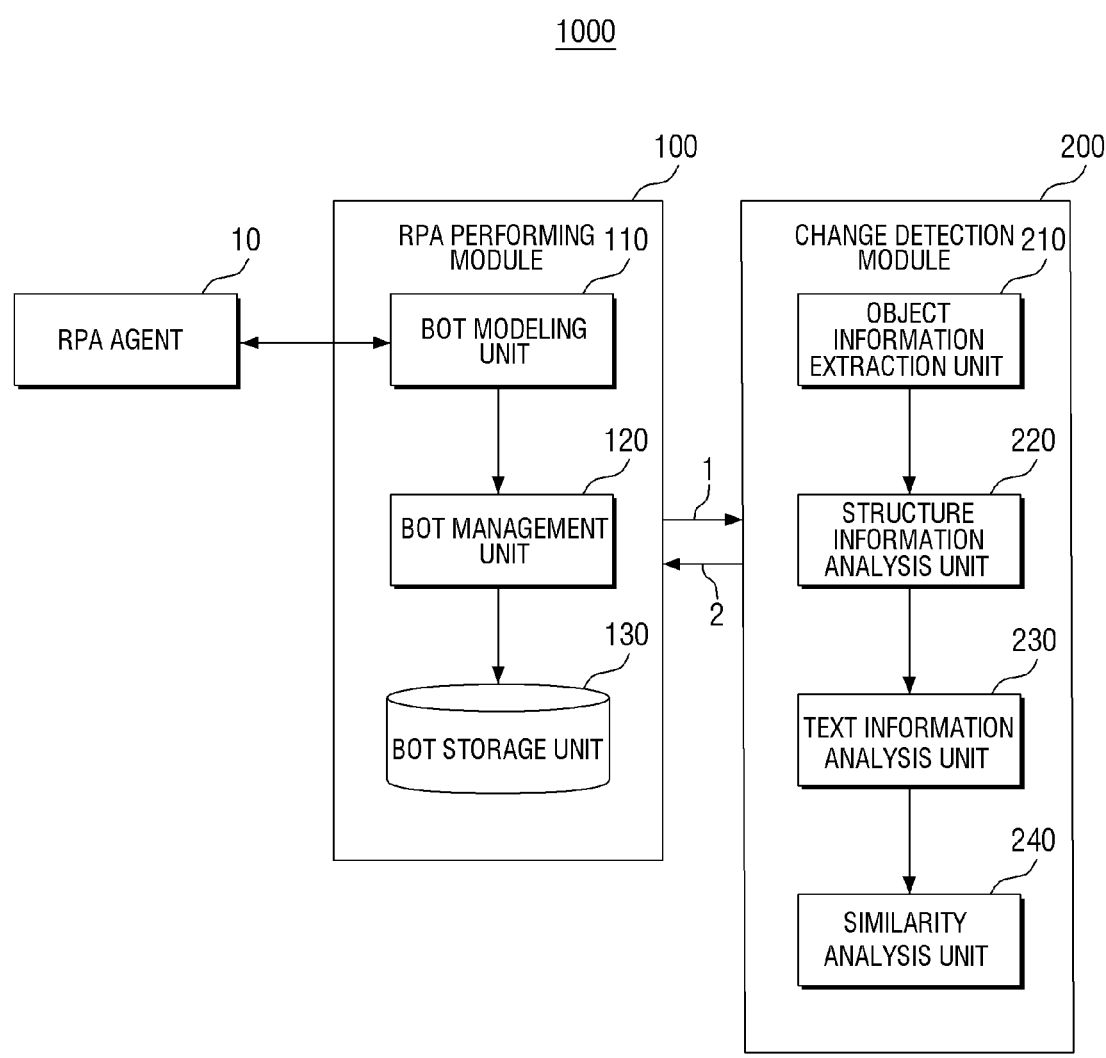
FIG. 1 is a block diagram of a ROBOT process automation (RPA) apparatus according to embodiments of the present disclosure.

Hereinafter, exemplary embodiments of the present disclosure will be described more fully with reference to the attached drawings. Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the invention to those skilled in the art, and the present disclosure will only be defined by the appended claims.

In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

In describing components of the present disclosure, it is possible to use the terms such as first, second, A, B. (a), (b), etc. These terms are only intended to distinguish a component from another component, and a nature, an order, or a sequence is not limited by that term. When a component is described as being "connected," "coupled" or "connected" to another component, the component may be directly connected or able to be connected to the other component; however, it is also to be understood that an additional component may be "interposed" between the two components, or the two components may be "connected," "coupled" or "connected" through an additional component.

It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Hereinafter, various embodiments of the present disclosure for solving the above-described technical problems will be described.

FIG. 1 is a block diagram of a ROBOT process automation (RPA) apparatus 1000 according to embodiments of the present disclosure. Referring to FIG. 1, the RPA apparatus 1000 includes an RPA performing module 100 and a change detection module 200. In an embodiment, the RPA apparatus 1000 may further include an RPA agent 10 which collects working environment information and interacts with a user by residing in an active memory of a computing device while an RPA program is executed.

The RPA performing module 100 is a software module that creates, stores, manages and executes a bot for RPA. The RPA performing module 100 may include a bot modeling unit 110 which creates a bot for repeatedly performing preliminary work according to a user's setting, a bot management unit 120 which registers, manages and executes the created bot, and a bot storage unit 130 which stores the bot under the control of the bot management unit 120.

Figure 2:
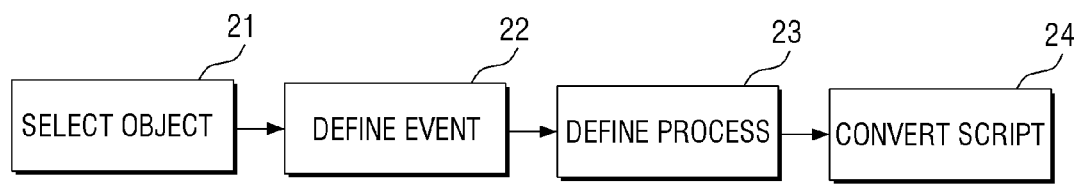
FIG. 2 is a diagram for conceptually explaining a method by which an RPA performing module illustrated in FIG. 1 creates a bot.

The bot modeling unit 110 detects a user's manipulation of a user interface (UI) object displayed on a screen and creates a bot in a script form by mapping a task event to the UI object. FIG. 2 illustrates a series of operations 20 in which the bot modeling unit 110 creates a bot for RPA.

Referring to FIG. 2, in operation 21, the bot modeling unit 110 selects an object to which RPA will be applied by detecting a user's manipulation of a UI object. In an embodiment, the UI object may be a specific button, a text input box, or a list item displayed on the screen of a computing device. In an embodiment, various methods such as CSS Selector, Xpath, COM Wrapper, and Mouse Event may be used to select the UI object. Next, the bot modeling unit 110 defines a unit event by mapping an event to be performed through RPA to the selected object in operation 22. The mapped event may be a manipulation event such as a key input or a mouse button click on the UI object. Next, the bot modeling unit 110 defines a process by arranging one or more unit events according to an RPA sequence in operation 23. Then, the bot modeling unit 110 creates an RPA bot by converting the arranged events and the process into a script form.

The bot management unit 120 registers a bot created by the bot modeling unit 110 and stores the bot in the bot storage unit 130. In addition, the bot management unit 120 executes the registered bot to perform RPA in a computing environment such as a physical server or a virtual machine according to a predetermined batch method. In addition, when an error occurs in an RPA process, the bot management unit 120 updates object information of the registered bot using information of a target object determined by a change detection method to be described later in FIG. 3 and subsequent drawings.

Specifically, if a working environment at a time when RPA is performed is different from a working environment at a time when a bot was first created, an object corresponding to object information stored previously may not be detected. In this case, since the bot cannot find an object on which RPA is to be performed, an error such as the malfunctioning of the bot or the stopping of the bot may occur. In this case, the bot management unit 120 may collect work information related to the error, for example, information about an object having the error, working environment information at a time (a first time) when the bot having the error was created and working environment information at a time (a second time) when the error occurred and may request the change detection module 200 to detect changes by sending the collected information to the change detection module 200. Then, the bot management unit 120 may receive a change detection result from the change detection module 200 and update the bot having the error.

The bot storage unit 130 stores a registered bot under the control of the bot management unit 120. The bot storage unit 130 is a storage medium that can store a registered bot and may be a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

In an embodiment, the bot storage unit 130 may store document information (e.g., an HTML page or a WPF page) of a working environment related to an object referred to by a registered bot, in addition to the registered bot.

When an error occur while a bot is executed to perform RPA, the change detection module 200 detects which object in a current working environment corresponds to an object referred to by an event having the error.

That is, the bot identifies an object (hereinafter, referred to as a 'target object') on which RPA is to be performed by referring to stored object information. However, if the shape or state of the object changes due to a change in the working environment, the stored object information may not accurately indicate the target object. In this case, the change detection module 200 detects which object in the current working environment is an object corresponding to the stored object information, that is, the target object based on information about the current working environment having the error and sends a difference between the object detected as the target object and the existing target object to the RPA performing module 100. The change detection module 200 includes an object information extraction unit 210 which extracts object information from working environment information and the like, a structure information analysis unit 220 which analyzes structure information of an object based on the extracted object information, a text information analysis unit 230 which analyzes and processes text information of the object based on the extracted object information, and a similarity analysis unit 240 which calculates the similarity between each object of the current working environment and a target object.

The object information extraction unit 210 extracts object information of a target object referred to by an event having an error based on working environment information (e.g., a work screen document) at a time (first time) when a bot was created. Here, the working environment information may include an HTML document, a CSS document, or a WPF document of an application program screen. The object information extracted by the object information extraction unit 210 includes structure information indicating a hierarchical structure of the object or attribute information indicating attributes of the object or an identifier of the object. Here, the attribute information may include information in a text form.

The structure information analysis unit 220 searches for objects having the same or similar hierarchical structure as the target object in the current working environment by using the structure information indicating the hierarchical structure of the target object in the extracted object information. In an embodiment, the structure information analysis unit 220 may determine objects, which have the same or similar hierarchical structure as the target object among objects of the current working environment, as candidate objects.

For each determined candidate object, the text information analysis unit 230 generates object identification text processed based on attribute information of the candidate object. The object identification text is text generated by processing information indicating attributes of an object (e.g., an ID of the object, a class name of the object, a title of the object, Xpath of the object, etc.) and is used to identify unique features of the object. In addition, the text information analysis unit 230 generates a vector corresponding to each candidate object by converting the object identification text through text embedding. In an embodiment, various text-based embedding models such as Word2Vec, FastText, Glove, Sent2Vec and Elmo may be used for text embedding.

The similarity analysis unit 240 calculates the similarity between a vector corresponding to the target object and a vector corresponding to each candidate object. Then, the similarity analysis unit 240 determines an object having a highest similarity value among one or more candidate objects as a target object and provides information about the determined target object (that is, a candidate object determined as the target object) to the RPA performing module 100.

According to the above configuration of the current embodiment, even if a working environment is changed, the RPA apparatus 1000 can perform RPA by accurately finding a target object by itself in the current working environment.

In addition, by automatically updating previously stored object information of the target object using object information in the current working environment, it can correct an error by itself without the need for a user to recreate a new bot or modify the existing bot. Accordingly, the existing bot can be used as it is without the need to recreate a new bot or modify the existing bot.

Furthermore, even if an RPA program or bot is sent to another user, it can operate by adapting to a working environment of the user (that is, it can correct an error by itself to suit a new working environment). This makes it possible to freely distribute the RPA program or bot and increases the versatility and activity of the RPA program or bot.

Figure 3:
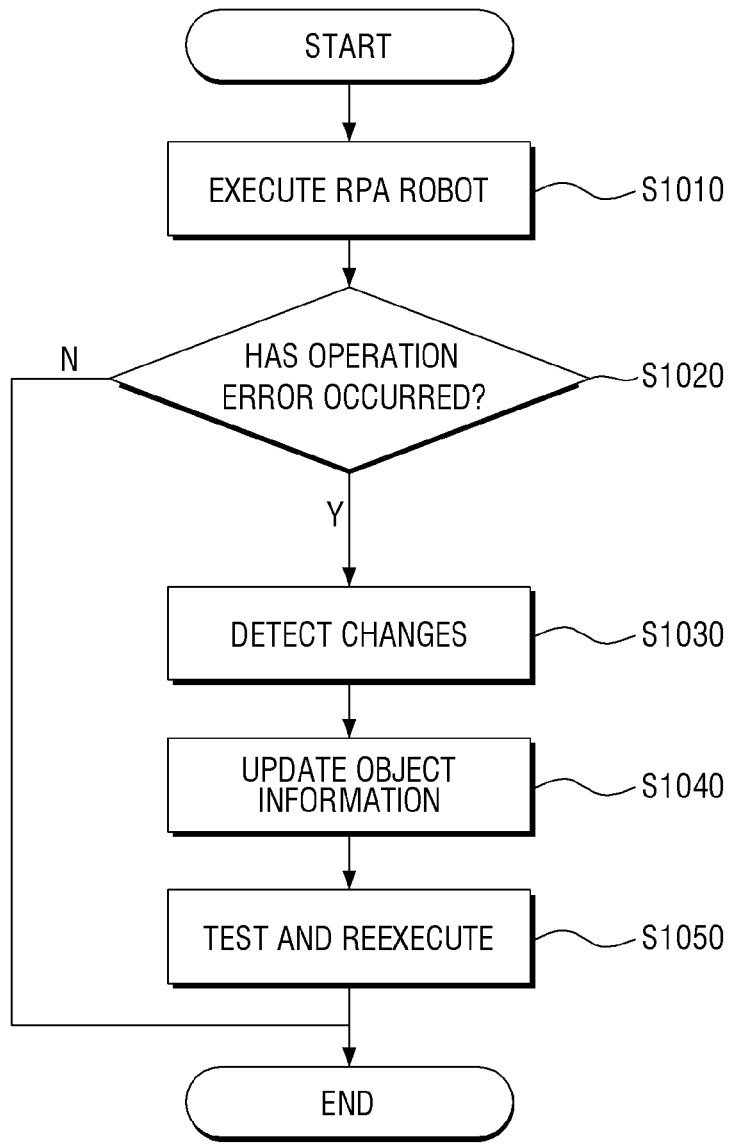
FIG. 3 is a flowchart illustrating an RPA method according to embodiments of the present disclosure.

FIG. 3 is a flowchart illustrating an RPA method according to embodiments of the present disclosure. Referring to FIG. 3, the RPA method may be composed of five operation S1010 through S1050. When the subject of each operation in FIG. 3 is not specified, it is assumed that the subject is the RPA apparatus 1000 of FIG. 1.

In operation S1010, a bot for performing RPA is executed. For example, the bot management unit 120 may execute a registered bot to perform RPA in a computing environment such as a physical server or a virtual machine according to a predetermined batch method.

In operation S1020, it is determined whether an operation error has occurred during the RPA. If no operation error has occurred, the RPA is continuously performed and then terminated in the current embodiment. On the other hand, if an operation error has occurred, the current embodiment proceeds to operation S1030.

In operation S1030, a change detection operation is performed. That is, it is detected how object information of a target object having the operation error has changed in a current working environment or which object in the current working environment corresponds to the target object. In an embodiment, change detection methods to be described in embodiments of FIG. 4 and subsequent drawings may be used to detect the target object in the current working environment in operation S1030.

In operation S1040, the previously stored object information of the target object is updated using object information of an object detected as the target object. Here, a script of the bot having the error may be modified by completely replacing the previously stored object information with the object information of the detected object. Alternatively, differences between the object information of the detected object and the previously stored object information may be identified, and then the previously stored object information may be updated only for the differences.

In operation S1050, the updated result is tested for abnormality, and the bot is executed again if there is no abnormality.

Figure 4:
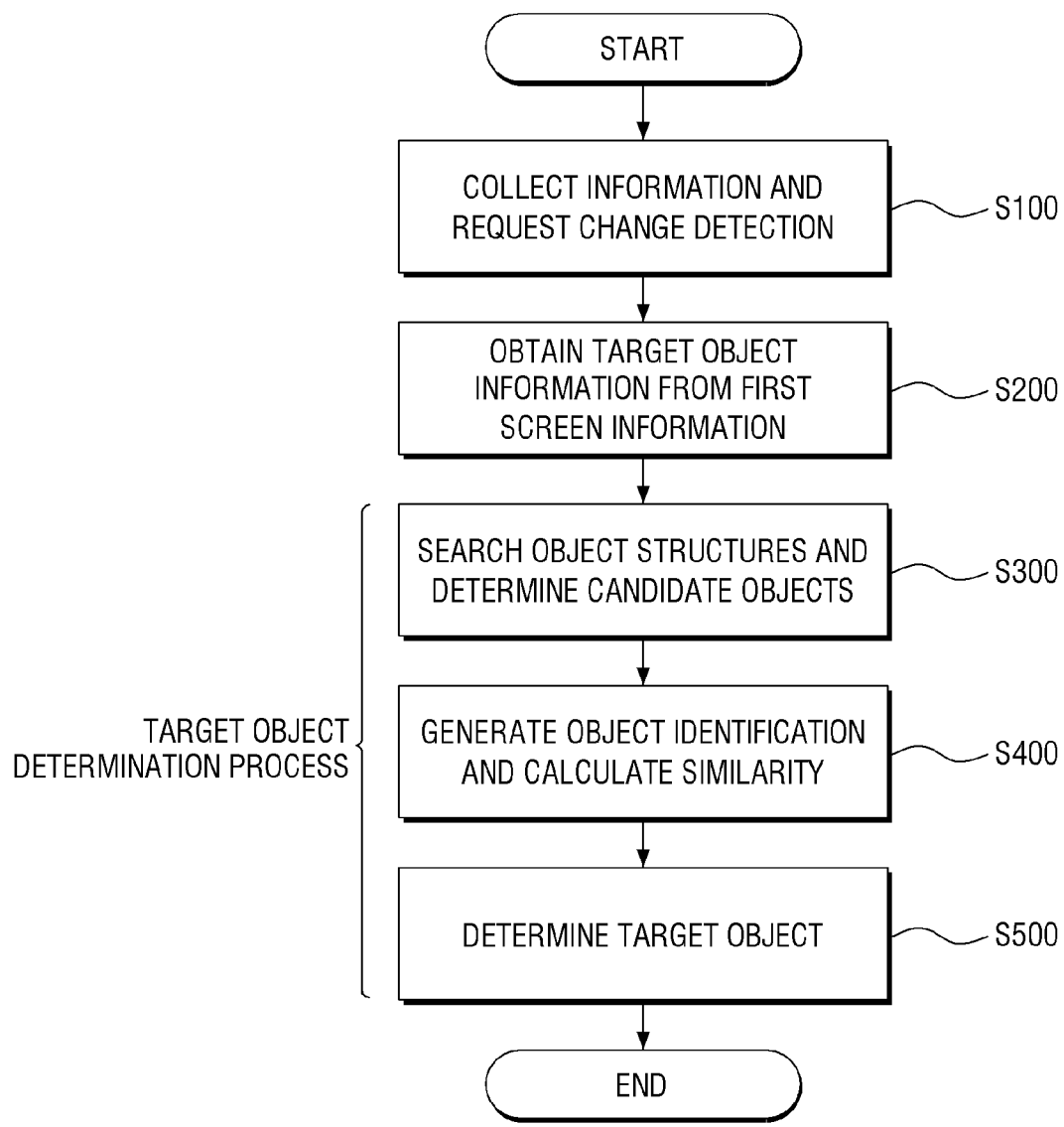
FIG. 4 is a flowchart illustrating a specific change detection method in the RPA method of FIG. 3.

FIG. 4 is a flowchart illustrating a specific change detection method in the RPA method of FIG. 3. Referring to FIG. 4, the change detection method may be composed of five operations S100 through S500. When the subject of each operation in FIG. 4 is not specified, it is assumed that the subject is the RPA apparatus 1000 of FIG. 1.

In operation S100, the RPA performing module 100 collects information needed to detect changes and requests the change detection module 200 to detect changes. Here, the collected information may include information about a target objet having an error, working environment information at a time when a bot was created or working environment information at a previous update time (i.e., working environment information at a first time), or working environment information at a current time (i.e., working environment information at a second time). In an embodiment, the working environment information at the current time may include an execution log or system monitoring information at a time when the error occurred. The collected information may be sent to the change detection module 200 when a request for change detection is made.

In operation S200, the change detection module 200 obtains object information of the target object referred to by an event having the error during RPA from screen information (hereinafter, referred to as 'first screen information') among the screen information at the time when the bot was created and the working environment information at the previous update time. In an embodiment, the obtaining of the object information of the target object may be performed by the object information extraction unit 210 of the change detection module 200.

In an embodiment, the object information of the target object is information used to identify the target object in the first screen information and may include various attribute information such as an ID of the target object, a class name of the target object, a title of the target object, Xpath of the target object, etc.

In addition, the object information of the target object may further include a hierarchical structure of the target object as information indicating the structure of the target object. The hierarchical structure of the target object is information about the hierarchical relationship between nodes identified around the target object in a tree structure of objects in the first screen information and may include tag information of the target object, tag information of a parent object of the target object, tag information of a child object of the target object, or tag information of a neighbor object of the target object. Here, a depth of the hierarchical structure of the target object may be defined variously depending on embodiments.

In operation S300, the change detection module 200 obtains structure information of objects included in screen information (hereinafter, referred to as 'second screen information') included in the information about the current working environment having the error during the RPA and searches for objects having the same object structure as the target object. Then, candidate objects are determined based on the search result from among the objects included in the second screen information. In an embodiment, the obtaining and searching of the object structures and the determining of the candidate objects may be performed by the structure information analysis unit 220 of the change detection module 200. Operation S300 will now be described in more detail with reference to FIGS. 5 and 6.

Figure 5:
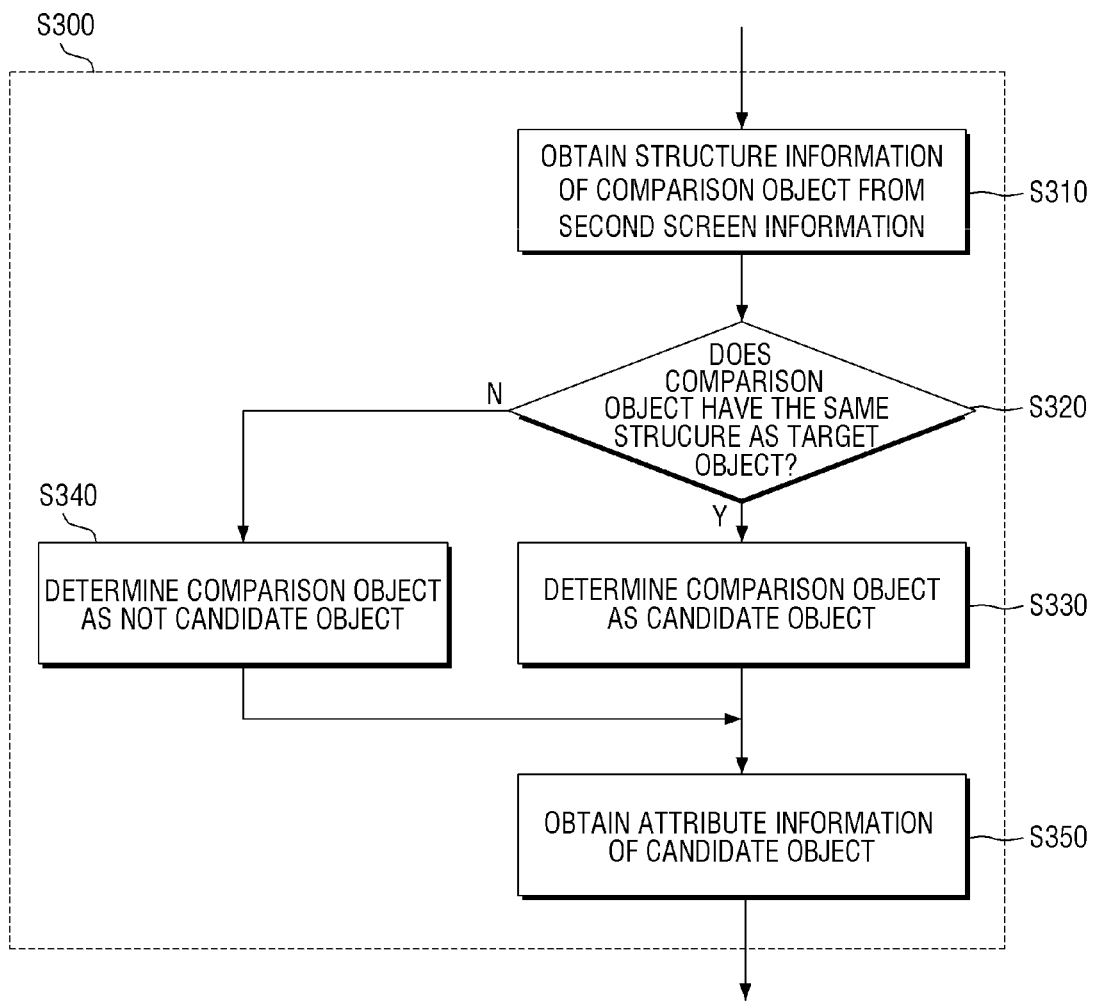
FIG. 5 is a flowchart illustrating an embodiment of operation S300 for object structure search and candidate object determination illustrated in FIG. 4.

FIG. 5 is a flowchart illustrating an embodiment of operation S300 for object structure search and candidate object determination illustrated in FIG. 4. Referring to FIG. 5, operation S300 may be composed of five operations S310 through S350.

Figure 6:
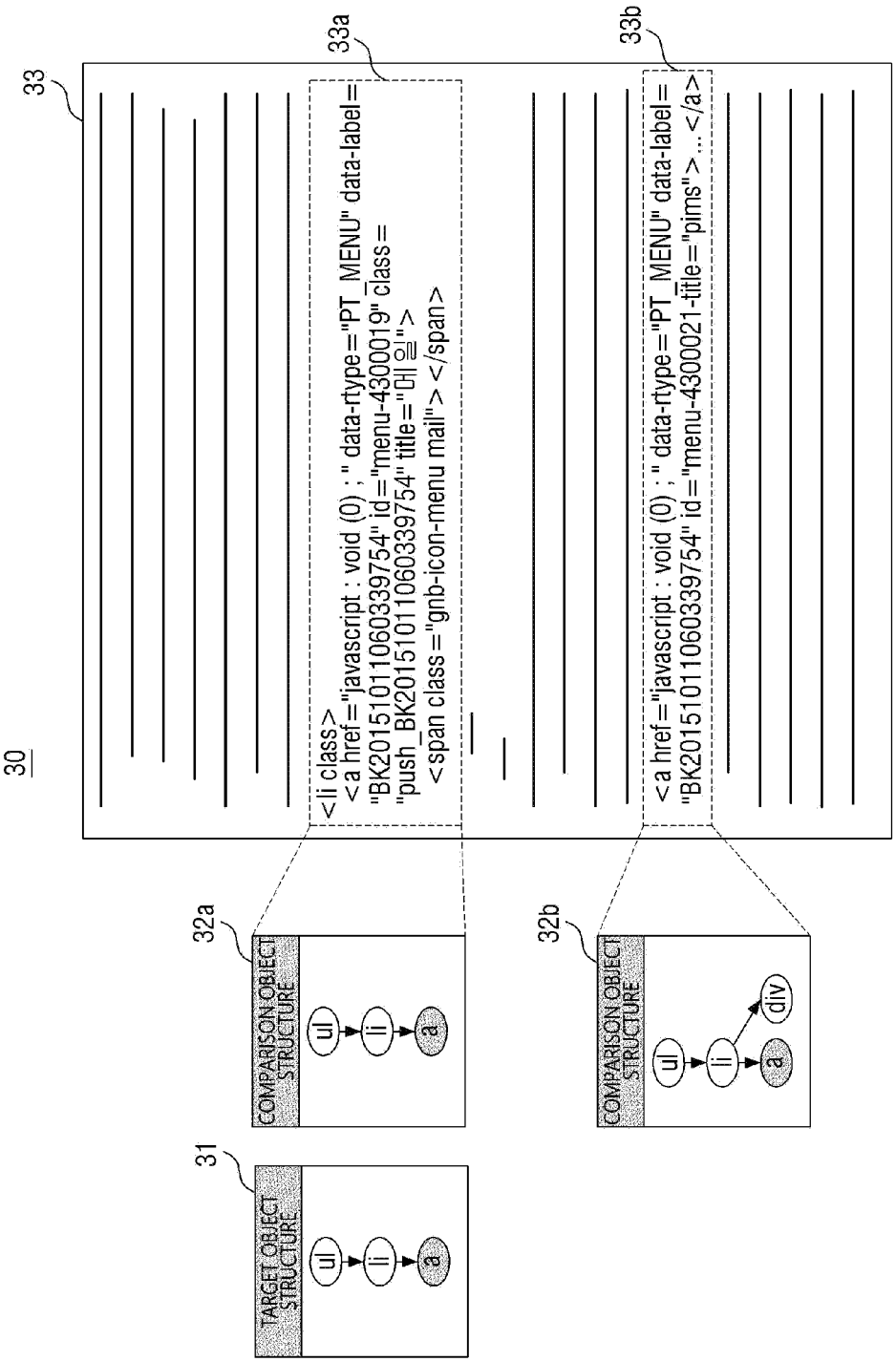
FIG. 6 is a diagram for conceptually explaining a method of searching for and extracting comparison objects having the same structure as the structure of a target object.

In operation S310, the change detection module 200 obtains structure information of comparison objects from the second screen information. An example method of obtaining structure information of comparison objects is illustrated in FIG. 6. Referring to FIG. 6, second screen information 30 including a plurality of pieces of object information 32b and 33b is illustrated. Here, the second screen information 30 is illustrated as document information in an HTML format. The change detection module 200 analyzes the second screen information 30 and searches for objects included in the second screen information 30. Since the found objects 32b and 33b will be selected as candidate objects through comparison with the target object, they will hereinafter be referred to as 'comparison objects.' In addition, structure information 32a and 33a of the comparison objects 32b and 33b is obtained from the comparison objects 32b and 33b. In the current embodiment, the obtained structure information 32a and 33a indicates hierarchical structures in which depths of the comparison objects 32b and 33b are 2.

As in the example of the target object, the hierarchical structure of a comparison object is information about the hierarchical relationship between nodes identified around the comparison object in a tree structure of objects in the second screen information and may include tag information of the comparison object, tag information of a parent object of the comparison object, tag information of a child object of the comparison object, or tag information of a neighbor object of the comparison object.

Referring back to FIG. 5, in operation S320, the change detection module 200 analyzes similarity by comparing the structures of the found comparison objects 32b and 33b with the structure of the target object. Here, various tree matching algorithms such as an editing distance (e.g., Levenshtein Distance) may be used to calculate the similarity between the hierarchical structures. Since details of the editing distance algorithm are widely known in the art to which the present disclosure pertains, a detailed description thereof will be omitted here. If it is determined that the structural similarity between a comparison object and the target object is equal to or greater than a predetermined level as a result of analyzing the similarity between the object structures, the current embodiment proceeds to operation S330 and determines the comparison object as a candidate object. Otherwise, the current embodiment proceeds to operation S340 and determines the comparison object as not a candidate object.

Referring to the example of FIG. 6, the comparison object structure 32a at the top has exactly the same structure as a target object structure 31. Therefore, the comparison object 32b is determined as a candidate object. On the other hand, the comparison object structure 33a at the bottom is different from the target object structure 31 because an intermediate node li has a subnode div in addition to a subnode a. Moreover, the similarity between the comparison object structure 33a and the target object structure 31 is calculated to be equal to or less than a threshold. Therefore, the comparison object 33b is not determined as a candidate object.

Referring back to FIG. 5, in operation S350, the change detection module 200 obtains and stores attribute information of the object 32b determined as a candidate object so as to perform operation S400.

Referring back to FIG. 4, in operation S400, the change detection module 200 generates object identification text for each candidate object based on attribute information of the candidate object. Then, the change detection module 200 calculates the similarity between each candidate object and the target object based on the generated object identification text. In an embodiment, the generating of the object identification text may be performed by the text information analysis unit 230 of the change detection module 200, and the calculating of the similarity may be performed by the similarity analysis unit 240. Operation S400 will now be described in more detail with reference to FIG. 7.

Figure 7:
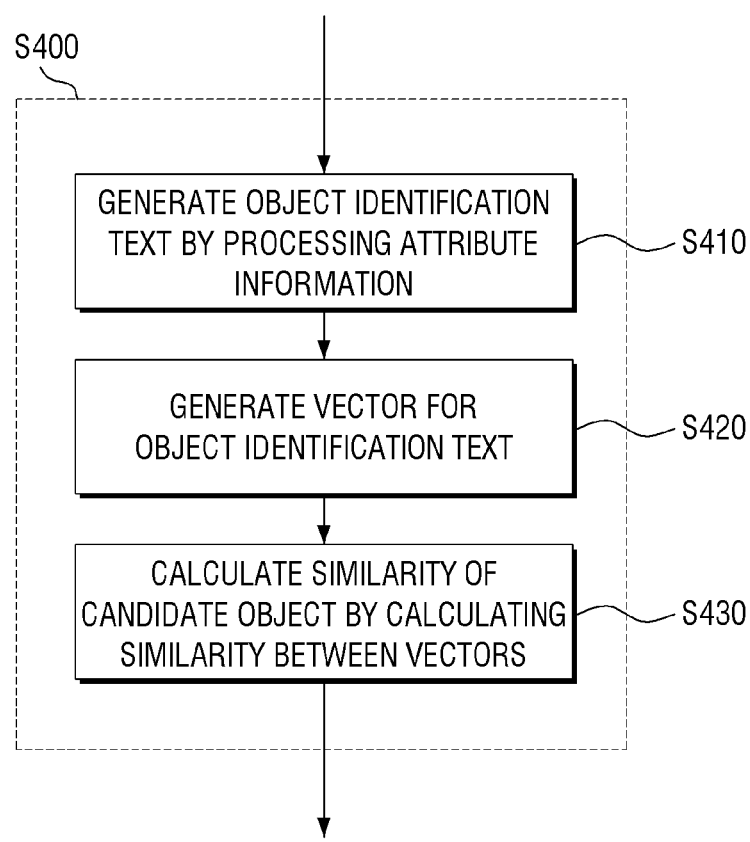
FIG. 7 is a flowchart illustrating an embodiment of operation S400 for object identification text generation and similarity calculation illustrated in FIG. 4.

FIG. 7 is a flowchart illustrating an embodiment of operation S400 for object identification text generation and similarity calculation illustrated in FIG. 4. Referring to FIG. 7, operation S400 may be composed of three operations S410 through S430.

In operation S410, the change detection module 200 generates object identification text by processing attribute information of a candidate object. When candidate objects are determined based on the second screen information in operation S300, attribute information of the candidate objects (e.g., IDs of the candidate objects, class names of the candidate objects, titles of the candidate objects, Xpath of the candidate objects, etc.) is extracted and preprocessed into a form for vectorization. Here, the result of preprocessing the attribute information of each candidate object is defined as object identification text.

Figure 8:
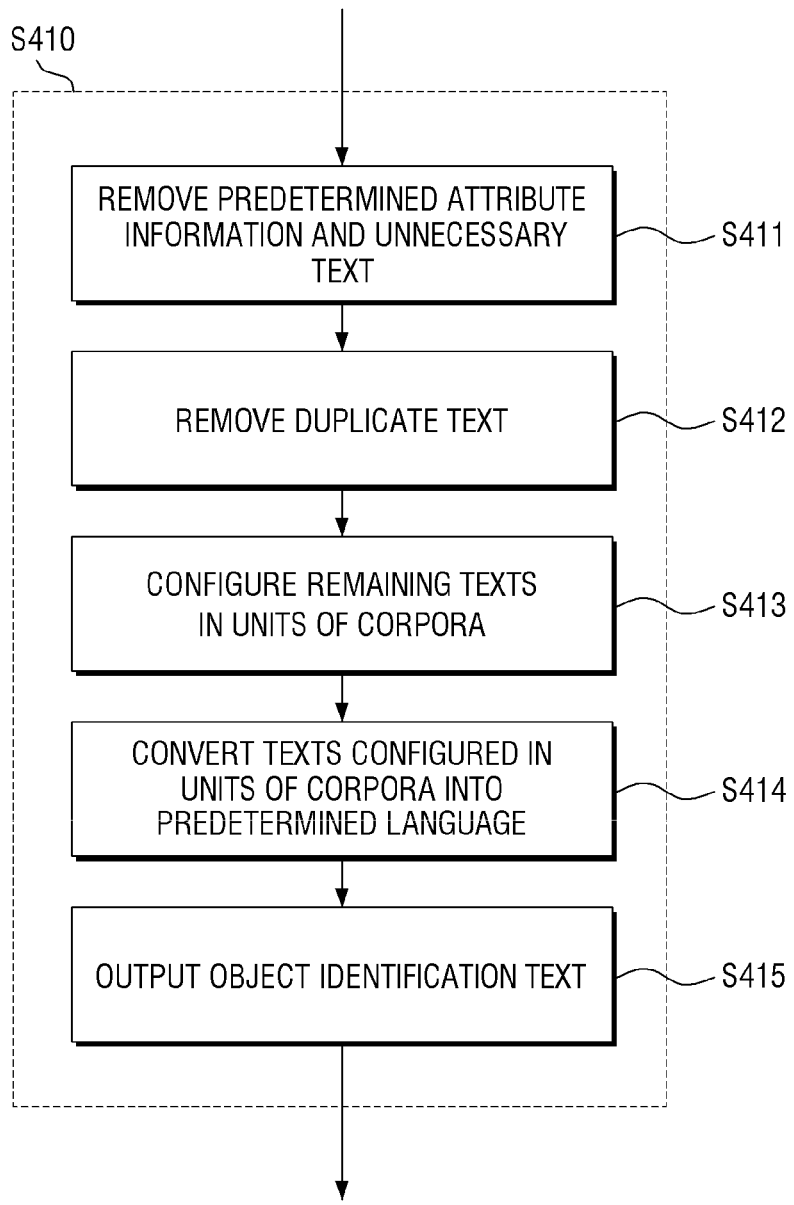
FIG. 8 is a flowchart illustrating an embodiment of operation S410 illustrated in FIG. 7.

FIG. 8 is an embodiment of operation S410 illustrated in FIG. 7 and illustrates a series of operations of preprocessing attribute information of candidate objects. A description will now be given with reference to FIG. 8. Here, it is assumed that the attribute information is information in a text form.

First, in operation S411, the change detection module 200 removes predetermined attribute information and unnecessary text. Here, the predetermined attribute information refers to attribute information determined in advance to be excluded from the determination of similarity to the target object because it fails to indicate unique characteristics of a candidate object or has a weak ability to identify the candidate object. In addition, the unnecessary text refer to text (such as special characters or useless morphemes) that fails to indicate or weakly indicates the unique characteristics of the candidate object.

In operation S412, the change detection module 200 removes duplicate text from the remaining attribute information. This considers the fact that the frequency of appearance of a text does not affect the result in the similarity determination method. Therefore, the duplication of a repeatedly appearing text is removed. However, this is merely one example, and operation S412 may be omitted in some cases. For example, if the similarity determination algorithm is an algorithm that reflects the frequency of appearance of a text in the result, operation S412 may be omitted.

Operations S411 and S412 may be referred to as filtering operations for removing some of the attribute information of a candidate object.

In operation S413, the change detection module 200 configures the remaining texts (i.e., the texts remaining after the filtering operations) in units of corpora. In an embodiment, a corpus may be a word.

In operation S414, the change detection module 200 converts the texts configured in units of corpora into a predetermined language. For example, if the texts configured in units of corpora are texts in different languages (e.g., texts in Korea, English, Chinese and Japanese), they may be converted into one predetermined language so that the texts configured in units of corpora can be expressed in a single language. This is intended to process the texts configured in units of corpora through the same language model and considers the fact that, in the case of texts in multiple languages, it is generally difficult to train an artificial intelligence (AI) model for language processing and hard to expect good performance. Therefore, in order to improve the performance of the change detection module 200, texts in multiple languages are converted into one predetermined language using, e.g., a translation machine.

In operation S415, the change detection module 200 outputs a series of texts processed through operations S411 through S414 as object identification text.

In the current embodiment, through the above operations, the change detection module 200 generates texts indicating characteristics of a candidate object by refining attribute information of the candidate object and generates final data (i.e., object identification text) for vectorization by performing preprocessing and language conversion.

Referring back to FIG. 7, in operation S420, the change detection module 200 generates a vector (hereinafter, referred to as an 'eigenvector') for the generated object identification text. The eigenvector is a vector obtained by digitizing the object identification text using a text embedding model trained in advance through deep learning and is a vector corresponding to an individual candidate object. In an embodiment, the text embedding model is a deep learning AI model, and various text-based embedding models such as Word2Vec, FastText, Glove, Sent2Vec and Elmo may be used. The specific configurations and contents of Word2Vec, FastText, Glove, Sent2Vec and Elmo are widely known in the art to which the present disclosure pertains, and thus a detailed description thereof will be omitted here.

Figure 9:
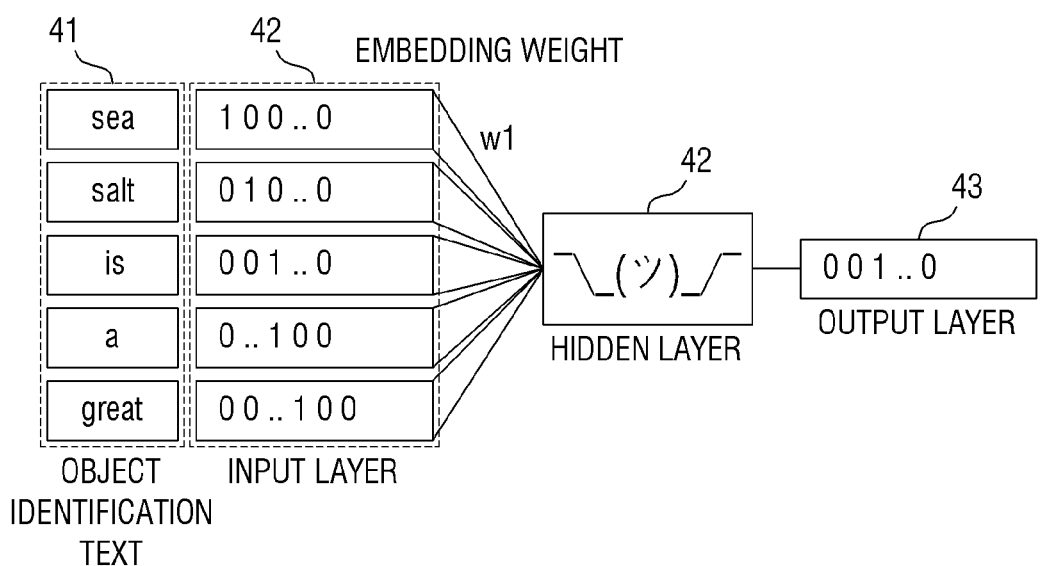
FIG. 9 is a diagram for conceptually explaining a method of generating a vector for object identification text through text embedding.

FIG. 9 is a diagram for conceptually explaining a method of generating an eigenvector for object identification text through text embedding. Referring to FIG. 9, an example of converting object identification text 41 including five words 'sea,' 'salt,' 'is.' 'a,' and 'great' into an eigenvector 43 is illustrated. In FIG. 9, when each word of the object identification text 41 is input to an input layer, an embedding weight for each word is reflected. Then, the eigenvector 43 corresponding to the object identification text 41 is output through an output layer after an operation of a hidden layer 42. Here, the input layer, the hidden layer, and the output layer are deep learning elements constituting the text embedding model. In an embodiment, individual words of the object identification text 41 may be converted into eigenvectors 42 corresponding to the individual words before being input to the input layer or while in the input layer.

The eigenvectors obtained through the text embedding method are configured to have similar sizes and directions as their object identification texts are similar to each other. That is, in the current embodiment, an eigenvector of a candidate object has a size and direction similar to those of an eigenvector of a target object as object identification text of the candidate object is similar to object identification text of the target object.

Referring back to FIG. 7, in operation S430, the change detection module 200 calculates the similarity of each candidate object by calculating the similarity between the vectors (e.g., eigenvectors) of each candidate object and the target object.

The method of generating object identification text by processing attribute information of a candidate object has been described above in operation S410, and the method of generating an eigenvector of the candidate object based on the generated object identification text has been described above in operation S420. Similarly, object identification text and an eigenvector may also be generated for the target object. The current embodiment will be described based on the premise that an eigenvector corresponding to the target object is calculated.

The change detection module 200 calculates the similarity between the calculated eigenvector of each candidate object and the eigenvector of the target object. Here, the similarity between eigenvectors may be calculated using various methods such as Cosine Similarity, Euclidean Distance, Manhattan Distance, and Minkowski Distance. The specific configurations and contents of Cosine Similarity, Euclidean Distance, Manhattan Distance, and Minkowski Distance are widely known in the art to which the present disclosure pertains, and thus a detailed description thereof will be omitted here. The similarity between the eigenvector of each individual candidate object and the eigenvector of the target object calculated using the above methods indicates the similarity of the candidate object.

Referring back to FIG. 4, in operation S500, the change detection module 200 determines a candidate object, which has a highest similarity value as a result of the similarity calculation, as a target object in the current working environment.

Specifically, the change detection module 200 arranges the candidate objects based on the calculated similarity values of the candidate objects. Then, the change detection module 200 determines a candidate object having a higher similarity value than other candidate objects as an object corresponding to the target object (that is, determines a candidate object having the highest similarity value among the candidate objects as the target object).

In an embodiment, the change detection module 200 may provide object information (e.g., attribute information or structure information) of a candidate object determined as the target object to the RPA performing module 100, and the RPA performing module 100 may update the object information of the target object based on the received object information.

An example computing device 2000 that can implement devices according to various embodiments of the present disclosure will now be described with reference to FIG. 10.

Figure 10:
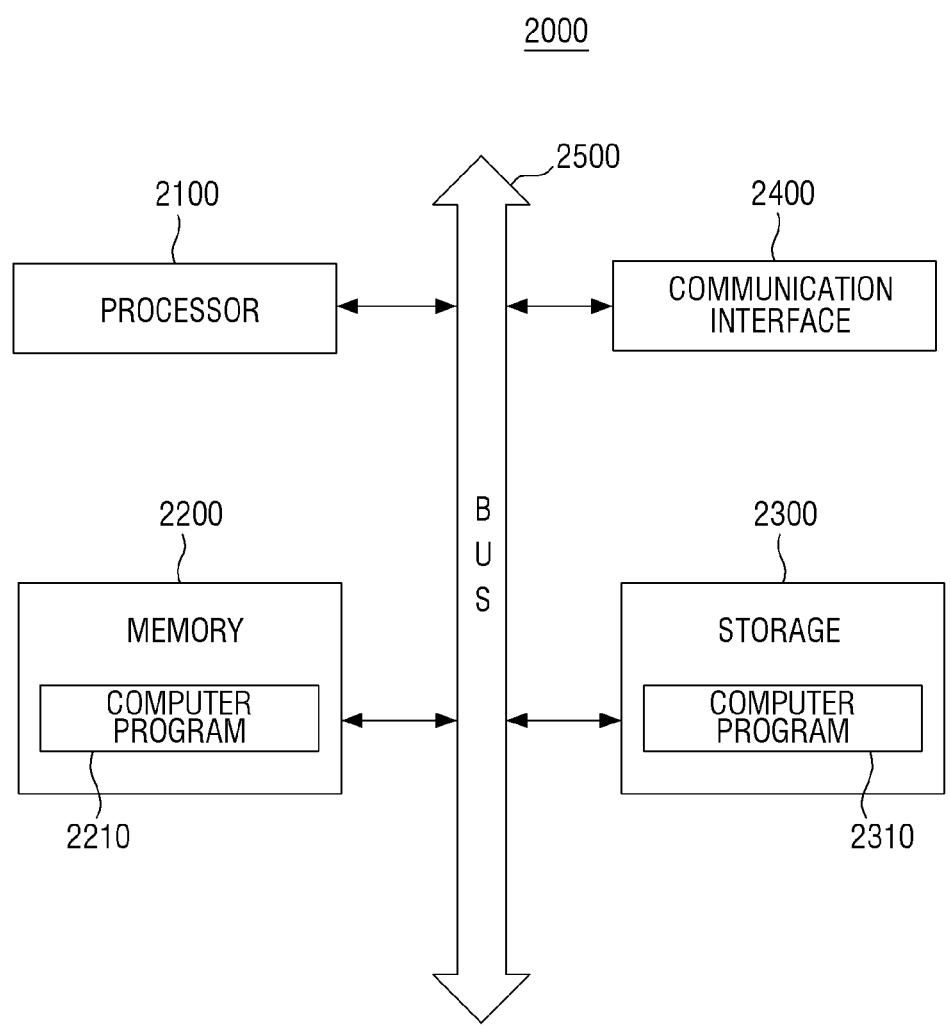
FIG. 10 is a block diagram of an example computing device that can implement devices according to various embodiments of the present disclosure.

FIG. 10 illustrates the hardware configuration of a computing device 2000. Referring to FIG. 10, the computing device 2000 may include one or more processors 2100, a memory 2200 which loads a computer program to be executed by the processors 2100, a bus 2500, a communication interface 2400, and a storage 2300 which stores a computer program 2310. In FIG. 10, only the components related to the embodiments of the present disclosure are illustrated. Therefore, it will be understood by those of ordinary skill in the art to which the present disclosure pertains that other general-purpose components can be included in addition to the components illustrated in FIG. 10.

The processors 2100 control the overall operation of each component of the computing device 2000. The processors 3100 may include a central processing unit (CPU), a microprocessor unit (MPU), a micro-controller unit (MCU), a graphic processing unit (GPU), or any form of processor well known in the art to which the present disclosure pertains. In addition, the processors 2100 may perform an operation on at least one application or program for executing methods/operations according to various embodiments of the present disclosure. The computing device 2000 may include one or more processors.

The memory 2200 stores various data, commands and/or information. The memory 2200 may load one or more programs 2310 from the storage 2300 in order to execute methods/operations according to various embodiments of the present disclosure. The memory 2200 may be implemented as a volatile memory such as a random access memory (RAM), but the technical scope of the present disclosure is not limited to this case.

The bus 2500 provides a communication function between the components of the computing device 2000. The bus 2500 may be implemented as various forms of buses such as an address bus, a data bus, and a control bus.

The communication interface 2400 supports wired and wireless Internet communication of the computing device 2000. In addition, the communication interface 2400 may support various communication methods other than Internet communication. To this end, the communication interface 2400 may include a communication module well known in the art to which the present disclosure pertains. In some cases, the communication interface 2400 may be omitted.

The storage 2300 may non-temporarily store the programs 2310 and various data. The storage 2300 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

The computer program 2310 may include one or more instructions that cause the processors 2100 to perform methods/operations according to various embodiments of the present disclosure when the computer program 2310 is loaded into the memory 2200. That is, the processors 2100 may perform the methods/operations according to the various embodiments of the present disclosure by executing the instructions.

For example, the above-described RPA performing module which creates and executes a bot for RPA and the above-described change detection module which, when an error occurs during execution of the bot, detects changes in an object referred to by an event having the error may be software modules included in the computer program 2310. Here, the computer program 2310 may include instructions for performing an operation of obtaining target object information from first screen information, an operation of searching for or extracting objects having the same structure as a structure of a target object and determining candidate objects, an operation of generating object identification text by processing attribute information of each object, an operation of generating a vector of the object identification text through text embedding, an operation of calculating the similarity of each candidate object by calculating the similarity between vectors, and an operation of determining an object corresponding to the target object based on the similarity of each candidate object.

Until now, various embodiments of the present disclosure and effects of the embodiments have been described with reference to FIGS. 1 through 10. However, the effects of the technical spirit of the present disclosure are not restricted to the one set forth herein. The above and other effects of the embodiments will become more apparent to one of daily skill in the art to which the embodiments pertain by referencing the claims.

The technical spirit of the present disclosure described above with reference to FIGS. 1 through 10 can be implemented in computer-readable code on a computer-readable medium. The computer-readable recording medium may be, for example, a removable recording medium (a compact disc (CD), a digital versatile disc (DVD), a Blu-ray disc, a universal serial bus (USB) storage device or a portable hard disk) or a fixed recording medium (a ROM, a RAM or a computer-equipped hard disk). The computer program recorded on the computer-readable recording medium may be transmitted to another computing device via a network such as the Internet and installed in the computing device, and thus can be used in the computing device.

Although it has been mentioned that all components configuring the embodiments of the present disclosure described hereinabove are combined with each other as one component or are combined and operated with each other as one component, the present disclosure is not necessarily limited to the above-mentioned embodiments. That is, all the components may also be selectively combined and operated with each other as one or more components without departing from the scope of the present disclosure.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. The exemplary embodiments should be considered in a descriptive sense only and not for purposes of limitation. Therefore, the scope of the present disclosure is defined not by the detailed description of the present disclosure but by the following claims, and all differences within the scope will be construed as being included in the present disclosure.

What is claimed is:

1. A change detection method for ROBOT process automation (RPA) performed by a computer device, the method comprising:
    obtaining object information of a target object from first working environment information at a first time; and
    determining a comparison object detected in second working environment information at a second time as an object corresponding to the target object based on the obtained object information of the target information,
    wherein the determining of the comparison object as the object corresponding to the target object comprises:
        searching for an object structure of the comparison object in the second working environment information and determining the comparison object as a candidate object according to the search result; and
        calculating similarity of the candidate object by generating object identification text of the candidate object based on attribute information of the candidate object, the calculating of the similarity comprising:
            generating the object identification text by processing the attribute information of the candidate object;
            generating a vector by converting the object identification text, the generating of the vector comprising generating an eigenvector of the candidate object by converting the object identification text through text embedding; and
            calculating the similarity of the candidate object by calculating similarity between vectors using the generated vector.

2. The method of claim 1, wherein the determining of the comparison object as the candidate object comprises:
    obtaining the object structure of the comparison object from the second working environment information;
    determining whether the object structure of the comparison object is the same or similar to an object structure of the target object; and
    determining the comparison object as the candidate object if it is determined that the object structure of the comparison object is the same or similar to the object structure of the target object.

3. The method of claim 1, wherein the object structure is information about a hierarchical relationship between nodes identified around the comparison object in a tree structure of objects in the second working environment information.

4. The method of claim 3, wherein the object structure comprises tag information of the comparison object, tag information of a parent object of the comparison object, tag information of a child object of the comparison object, or tag information of a neighbor object of the comparison object.

5. The method of claim 1, wherein the generating of the object identification text comprises:
    filtering out some of the attribute information of the candidate object;
    configuring texts, which remain after the filtering of the attribute information, in units of corpora; and
    converting the texts configured in units of corpora into a predetermined language.

6. The method of claim 1, wherein the eigenvector of the candidate object has a size and direction similar to those of an eigenvector of the target object as the object identification text of the candidate object is similar to object identification text of the target object.

7. The method of claim 1, wherein the determining of the comparison object as the object corresponding to the target object further comprises determining the candidate object as the object corresponding to the target object if the candidate object has a higher similarity value than other candidate objects.

8. The method of claim 1, further comprising providing object information of the comparison object to update the object information of the target object.

9. A change detection method for ROBOT process automation (RPA) performed by a computer device, the method comprising:
    executing a bot for RPA;
    determining whether an operation error of the bot has occurred;
    detecting changes in an object referred to by the bot if it is determined that the operation error has occurred; and
    updating object information of the object based on the change detection result,
    wherein the detecting of the changes in the object comprises:
    obtaining object information of a target object from first working environment information at a first time; and
    determining a comparison object detected in second working environment information at a second time as an object corresponding to the target object based on the obtained object information of the target information,
    wherein the determining of the comparison object as the object corresponding to the target object comprises:
        searching for an object structure of the comparison object in the second working environment information and determining the comparison object as a candidate object according to the search result; and
        calculating similarity of the candidate object by generating object identification text of the candidate object based on attribute information of the candidate object the calculating of the similarity comprising:
            generating the object identification text by processing the attribute information of the candidate object;
            generating a vector by converting the object identification text, the generating of the vector comprising generating an eigenvector of the candidate object by converting the object identification text through text embedding; and
            calculating the similarity of the candidate object by calculating similarity between vectors using the generated vector.

10. A change detection apparatus for ROBOT process automation (RPA) performed by a computer device, the apparatus comprising:
    a memory which loads a computer program comprising one or more instructions; and
    a processor which executes the instructions,
    wherein the computer program comprises:
    an RPA performing module which creates and executes a bot for RPA; and
    a change detection module which detects changes in an object referred to by an event having an error when the error occurs during execution of the bot,
    wherein the change detection module determines a comparison object detected in working environment information at a time when the error occurred as the object referred to by the event based on object information of the object referred to by the event; and
    wherein the change detection module is configured to detect the changes in the object by:
        obtaining object information of a target object from first working environment information at a first time; and
        determining a comparison object detected in second working environment information at a second time as an object corresponding to the target object based on the obtained object information of the target information, wherein the determining of the comparison object as the object corresponding to the target object comprises:
            searching for an object structure of the comparison object in the second working environment information and determining the comparison object as a candidate object according to the search result; and
            calculating similarity of the candidate object by generating object identification text of the candidate object based on attribute information of the candidate object, the calculating of the similarity comprising:
                generating the object identification text by processing the attribute information of the candidate object;
                generating a vector by converting the object identification text, the generating of the vector comprising generating an eigenvector of the candidate object by converting the object identification text through text embedding; and
                calculating the similarity of the candidate object by calculating similarity between vectors using the generated vector.

11. The apparatus of claim 10, wherein the RPA performing module comprises:
    a bot modeling unit which creates the bot for repeatedly performing preliminary work according to a user's setting;
    a bot management unit which registers and manages the bot created by the bot modeling unit; and
    a bot storage unit which stores the bot under the control of the bot management unit.

12. The apparatus of claim 10, wherein the change detection module comprises:
    an object information extraction unit which extracts the object information of the object referred to by the event or the comparison object;

a structure information analysis unit which analyzes structure information of the object referred to by the event or the comparison object based on the extracted object information;
a text information analysis unit which analyzes or processes the attribute information of the object referred to by the event or the comparison object based on the extracted object information; and
a similarity analysis unit which calculates the similarity between the object referred to by the event and the comparison object.

\* \* \* \* \*